United States Patent
Oh

(10) Patent No.: US 9,268,788 B2
(45) Date of Patent: Feb. 23, 2016

(54) APPARATUS AND METHOD FOR PROVIDING A CONTENT UPLOAD SERVICE BETWEEN DIFFERENT SITES

(71) Applicant: Samsung Electronics Co., Ltd., Suwon-si, Gyeonggi-do (KR)

(72) Inventor: Jong-Keun Oh, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 267 days.

(21) Appl. No.: 14/017,365

(22) Filed: Sep. 4, 2013

(65) Prior Publication Data

US 2014/0143287 A1 May 22, 2014

(30) Foreign Application Priority Data

Nov. 21, 2012 (KR) .......................... 10-2012-0132421

(51) Int. Cl.
*G06F 17/30* (2006.01)

(52) U.S. Cl.
CPC .... *G06F 17/30194* (2013.01); *G06F 17/30893* (2013.01)

(58) Field of Classification Search
CPC .............................................. G06F 17/30893
See application file for complete search history.

(56) References Cited

U.S. PATENT DOCUMENTS

| | | | |
|---|---|---|---|
| 6,976,210 B1* | 12/2005 | Silva et al. ..................... | 715/205 |
| 8,015,259 B2* | 9/2011 | Swahn .......................... | 709/217 |
| 2009/0030919 A1* | 1/2009 | Brezina et al. ................ | 707/100 |
| 2010/0161598 A1 | 6/2010 | Sung et al. | |
| 2011/0099294 A1* | 4/2011 | Kapur et al. .................. | 709/246 |
| 2011/0145695 A1* | 6/2011 | Matsui .......................... | 715/234 |
| 2011/0194140 A1 | 8/2011 | Sweet et al. | |
| 2011/0265157 A1 | 10/2011 | Ryder | |
| 2011/0295843 A1 | 12/2011 | Ingrassia, Jr. et al. | |

FOREIGN PATENT DOCUMENTS

| | | |
|---|---|---|
| KR | 1020100072974 | 7/2010 |
| KR | 1020120004615 | 1/2012 |
| KR | 1020120031199 | 3/2012 |
| WO | 2009145812 | 12/2009 |

* cited by examiner

*Primary Examiner* — Rehana Perveen
*Assistant Examiner* — Alexander Khong
(74) *Attorney, Agent, or Firm* — F. Chau & Associates, LLC

(57) ABSTRACT

A method of providing a content upload service includes receiving a user's first webpage from a first site server, creating a service file including content of the received user's first webpage, and uploading the created service file to a second site server that provides a second webpage of the user, different from the first webpage. Creating the service file includes providing a user setting screen including the first webpage to a user terminal in response to receiving a service request signal from the user terminal, generating identification information identifying the created service file, and generating a button on the user setting screen for setting a classification number. The service file is created based on content of a webpage selected through the user setting screen, and the created service file includes a sub-ID subordinated to a displayed classification number.

16 Claims, 7 Drawing Sheets

| MAIN ID | CLASSIFICATION ID 1 | SUB-ID 1-1 |
| | | SUB-ID 1-2 |
| | | ⋮ |
| | | SUB-ID 1-8 |
| | CLASSIFICATION ID 2 | SUB-ID 2-1 |
| | | SUB-ID 2-2 |
| | | ⋮ |
| | | SUB-ID 2-5 |
| | CLASSIFICATION ID 3 | SUB-ID 3-1 |
| | | SUB-ID 3-2 |
| | | ⋮ |
| | | SUB-ID 3-n |

APPARATUS AND METHOD FOR PROVIDING A CONTENT UPLOAD SERVICE BETWEEN DIFFERENT SITES

CROSS-REFERENCE TO RELATED APPLICATION

This application claims priority under 35 U.S.C. §119 to Korean Patent Application No. 10-2012-0132421, filed on Nov. 21, 2012, the disclosure of which is hereby incorporated by reference in its entirety.

TECHNICAL FIELD

Exemplary embodiments of the present inventive concept relate to an apparatus and method of providing a content upload service between different sites, and more particularly, to an apparatus and method of creating a file having content posted on webpages of one site and uploading the created file to another site.

DISCUSSION OF THE RELATED ART

Internet-based social network services facilitating the sharing of information between users via an online virtual space have been rapidly changing.

Previous types of online communities such as, for example, mini-homepages and blogs, are being replaced with newer, different types of online communities, such as, for example, Facebook® and Twitter®, and the advent of different, newer types of online communities is expected.

Many users have a strong desire to participate in the newest types of online communities, while also having a strong attachment to the content stored on webpages corresponding to old types of online communities. These users may wish to utilize this content from old online communities with new online communities.

SUMMARY

Exemplary embodiments of the present inventive concept provide an apparatus and method for uploading content provided by a specific page of one conventional website to another website, and posting the uploaded content on the another website.

According to an exemplary embodiment of the present inventive concept, a service providing apparatus includes a communicator configured to receive a first webpage of a user from a first site server through a network, and a file creator configured to create a service file including content of the first webpage received from the first site server. The communicator is further configured to upload the created service file to a second site server that provides a second webpage of the user, different from the first webpage.

In an exemplary embodiment, the communicator is further configured to receive user authentication information corresponding to the user's first webpage from a user terminal, transmit the received user authentication information to the first site server, and request the first site server to authenticate the user.

In an exemplary embodiment, the service providing apparatus includes a page provider configured to provide a user setting screen including the first webpage to the user terminal, in response to the communicator receiving a service request signal from the user terminal. The file creator is further configured to create the service file based on content of a webpage selected through the user setting screen.

In an exemplary embodiment, the file creator is further configured to generate identification (ID) information identifying the created service file.

In an exemplary embodiment, the page provider is further configured to generate a button on the user setting screen for setting a classification number, and the created service file includes a sub-ID subordinated to a displayed classification number.

In an exemplary embodiment, the communicator is further configured to receive user authentication information corresponding to the user's second webpage from a user terminal, transmit the received user authentication information to the second site server, request the second site server to authenticate the user, and upload the service file to the second site server.

In an exemplary embodiment, the service providing apparatus includes a link information extractor configured to identify a button of the first webpage that includes link information, extract the link information, and request to receive, from the first site server, a related webpage corresponding to the extracted link information, wherein the created service file further includes content of the related webpage.

In an exemplary embodiment, the communicator is further configured to receive the related webpage from the first site server, and sequentially receive webpages corresponding to subordinate page numbers identified in the related webpage based on an order of the subordinate page numbers. The created service file further includes content of the webpages corresponding to the subordinate page numbers.

In an exemplary embodiment, the file creator is further configured to generate classification IDs respectively corresponding to buttons including the link information, and assign sub-IDs subordinated to a specific classification ID to a service file of a webpage corresponding to a subordinate page number included in a webpage corresponding to the specific classification ID.

In an exemplary embodiment, the service file is an image file or a portable document format (PDF) file.

In an exemplary embodiment, the service providing apparatus includes a file converter configured to convert the service file to a different file having a format or a size satisfying a requirement of the second site server. The communicator is further configured to upload the converted service file to the second site server.

According to an exemplary embodiment of the present inventive concept, a method of providing a content upload service includes receiving a user's first webpage from a first site server, creating a service file including content of the received user's first webpage, and uploading the created service file to a second site server that provides a second webpage of the user.

In an exemplary embodiment, the service file is created using content of a webpage selected through a user setting screen displayed on a user terminal.

In an exemplary embodiment, the method includes identifying a button of the first webpage that includes link information, extracting the link information, receiving, from the first site server, a related webpage corresponding to the extracted link information. The created service file further comprises content of the related webpage.

In an exemplary embodiment, the method includes converting the service file to a different file having a format or a size satisfying a requirement of the second site server, and uploading the converted service file to the second site server.

According to an exemplary embodiment of the present inventive concept, a method of providing a content upload service includes transmitting a service request, from a user terminal to a service providing server, including user authentication information of a first webpage of a user stored at a first site server, transmitting an authentication request, from the service providing server to the first site server, requesting the first site server to authenticate the user, transmitting a user authentication signal, from the first site server to the service providing server, indicating whether user authentication was successful, transmitting a service file request, from the user terminal to the service providing server, requesting the service providing server to start generating a service file, transmitting a webpage request, from the service providing server to the first site server, requesting the first site server to transmit the first webpage, transmitting the first webpage from the first site server to the service providing server, creating the service file, wherein the service file comprises content of the first webpage, and uploading the created service file to a second site server that provides a second webpage of the user, different from the first webpage.

In an exemplary embodiment, the method includes receiving user authentication information corresponding to the user's second webpage from a user terminal, transmitting the received user authentication information to the second site server, and requesting the second site server to authenticate the user.

In an exemplary embodiment, the method includes identifying a button of the first webpage that includes link information, extracting the link information, and requesting to receive, from the first site server, a related webpage corresponding to the extracted link information, wherein the created service file further includes content of the related webpage.

In an exemplary embodiment, the method includes converting the service file to a different file having a format or a size satisfying a requirement of the second site server, and uploading the converted service file to the second site server.

In an exemplary embodiment, the service file is an image file or a portable document format (PDF) file.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
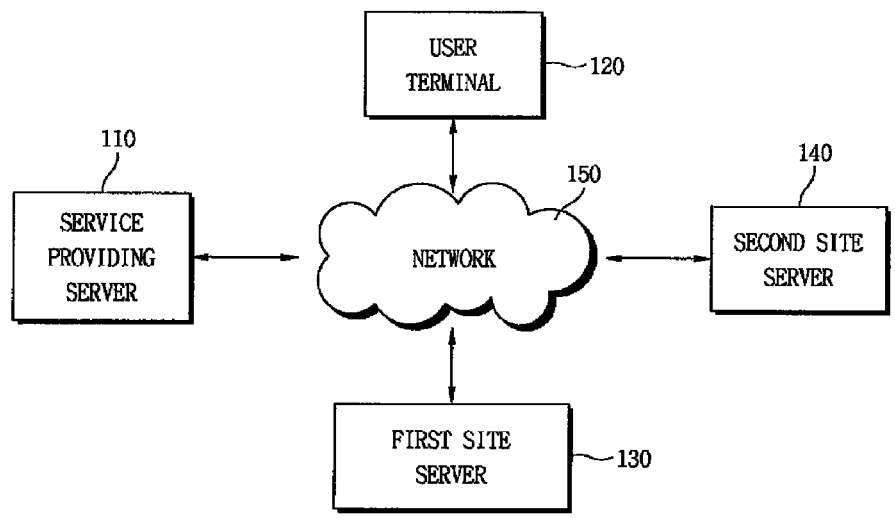
FIG. 1 is a diagram of a system for providing a content upload service between different sites, according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

It should also be noted that in some alternative implementations, operations may be performed out of the sequences depicted in the flowcharts. For example, two operations shown in the drawings to be performed in succession may in fact be executed substantially concurrently or even in reverse of the order shown, depending upon the functionality/acts involved.

FIG. 1 is a diagram of a system for providing a content upload service between different sites, according to an exemplary embodiment of the present inventive concept.

Referring to FIG. 1, the system may include a service providing server 110, a user terminal 120, a first site server 130, a second site server 140, and a network 150. Herein, the service providing server 110 may also be referred to as a service providing apparatus.

The service providing server 110 may create a service file with contents of a specific webpage provided by the first site server 130, and upload the service file to the second site server 140 in response to a service providing request of the user terminal 120.

The service file may be, for example, an image file, such as a Joint Photographic Group (JPG) file, a Joint Photographic Experts Group (JPEG) file, or a Graphics Interchange Format (GIF) file, or a Portable Document Format (PDF) file. However, the service file is not limited thereto. For example, the service file may be any type of file capable of including the content of the specific webpage provided by the first site server 130.

The user terminal 120 may connect to the service providing server 110 through the network 150, and request the service providing server 110 to create the service file with the content of the specific webpage provided by the first site server 130. The user terminal 120 may be any apparatus capable of connecting to a specific server through a network, such as, for example, a personal computer (PC), a smartphone, a tablet computer, etc.

For example, in the case of a PC, a user may connect to the service providing server 110 through a web browser such as, for example, Microsoft® Internet Explorer®, Apple® Safari®, or Google® Chrome™, and access a specific webpage provided by the service providing server 110.

The first site server 130 may transmit the corresponding webpage to the service providing server 110 in response to a webpage transmission request of the service providing server 110. The first site server 130 may provide, for example, a webpage, such as a blog or a mini-homepage (e.g., a user's personal space set up on a website such as, for example, a user's Facebook® profile). However, the type of webpage provided is not limited thereto.

The second site server 140 may register the service file uploaded by the service providing server 110 to a user's specific webpage, and enable another connected user to read the service file. The second site server 140 may provide a webpage for a social network service, such as, for example, Twitter® or Facebook®.

The network 150 may include, for example, a wired or wireless network that may access the Internet.

Figure 2:
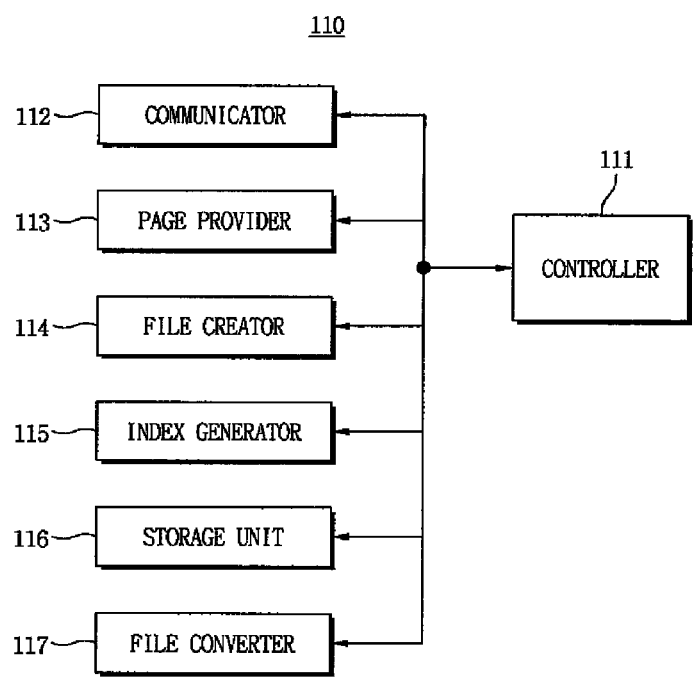
FIG. 2 is a block diagram of a service providing server, according to an exemplary embodiment of the present inventive concept.

FIG. 2 is a block diagram of the service providing server 110 of FIG. 1, according to an exemplary embodiment of the present inventive concept.

Referring to FIG. 2, the service providing server 110 may include a controller 111, a communicator 112, a page provider 113, a file creator 114, an index generator 115, a storage unit 116, and a file converter 117.

The controller 111 may control respective functions of a server configured to execute a service in response to a service request of the user terminal 120.

The communicator 112 may communicate with the user terminal 120, the first site server 130, and the second site server 140 via, for example, a wired or wireless connection through the network 150.

The page provider 113 may provide a webpage including, for example, a user setting screen to the user terminal 120.

The file creator 114 may create a service file (e.g., an image file or a PDF file) having content included in a webpage provided by the first site server 130 displayed on the user setting screen. The service file may be created, for example, according to a function button selected from the user setting screen.

The service file may further include identification (ID) information for distinguishing and identifying different service files.

The index generator 115 may generate index information regarding the created service file. The index information may include, for example, information regarding a file connection structure of the service file created according to one service request procedure.

The storage unit 116 may store the service file created by the file creator 114 and the index file generated by the index generator 115.

The file converter 117 may convert the service file stored in the storage unit 116 to a file satisfying requirements of the second site server 140. For example, the service file may be converted to have a certain format or size, as required by the second site server 140.

For example, when the created service file is a PDF file and a file format required by the second site server 140 is an image file, the file converter 117 may convert the service file to an image file, and the converted service file may be uploaded to the second site server 140.

In another example, when the created service file is an image file having a larger size than an image file size limit required by the second site server 140, the file converter 117 may convert the created service file into an image file downsized to a size that meets the size limit requirement of the second site server 140, and the downsized image file may be uploaded to the second site server 140.

Figure 3:
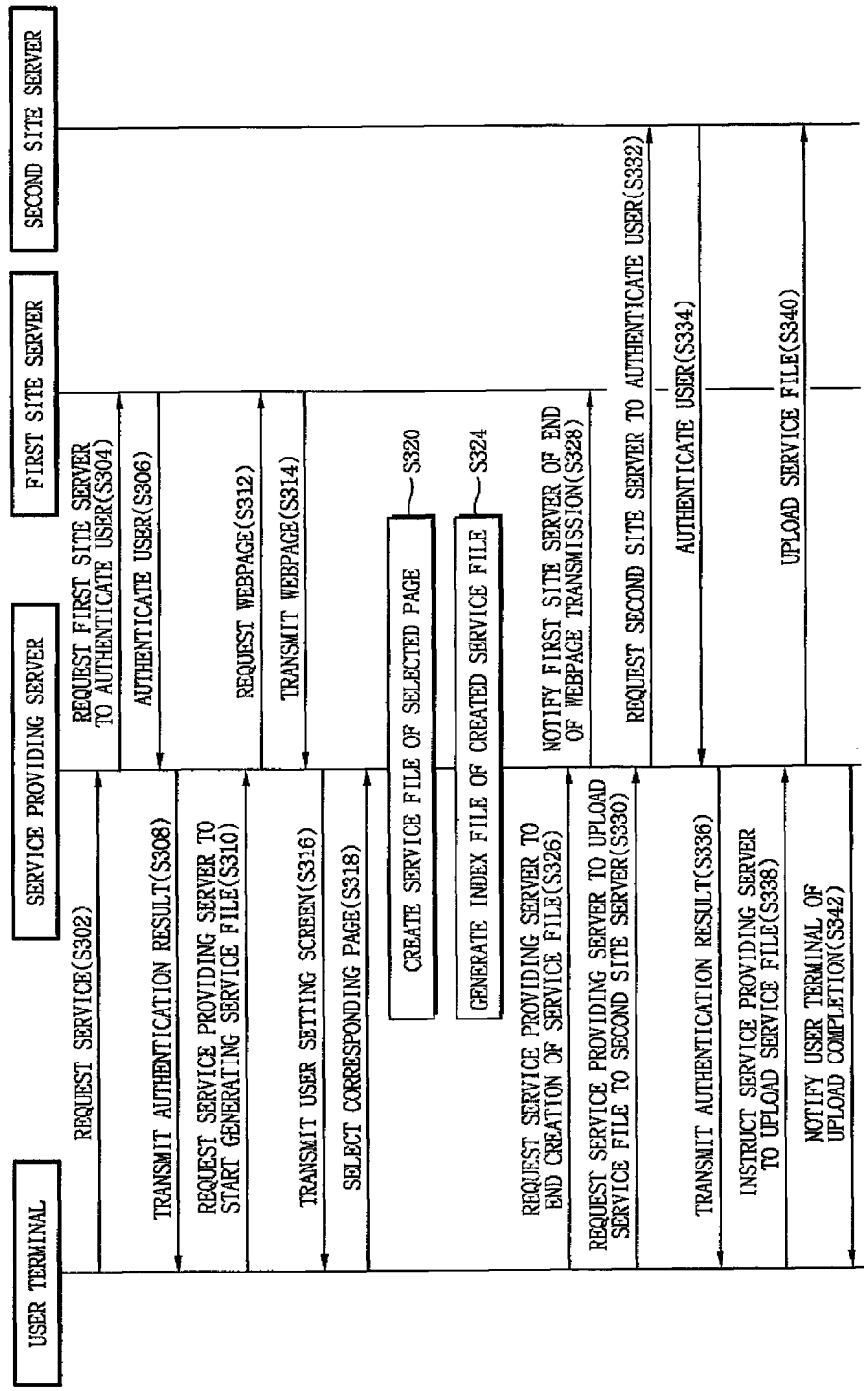
FIG. 3 is a flowchart illustrating a method of providing a content upload service between different sites, according to an exemplary embodiment of the present inventive concept.

FIG. 3 is a flowchart illustrating a method of providing a content upload service between different sites, according to an exemplary embodiment of the present inventive concept.

Referring to FIG. 3, at operation S302, a user terminal 120 connects to a service providing server 110, and requests the service providing server 110 to execute a service with respect to a specific webpage of a first site server 130. For example, after user authentication information (e.g., a login identification (ID) and a login password) of a first site is input through the user terminal 120 to a webpage provided by the service providing server 110, the user terminal 120 may transmit a service request signal including the user authentication information to the service providing server 110.

At operation S304, the user authentication information of the first site, which is received by the service providing server 110 through the user terminal 120, is transmitted to the first site server 130, and the first site server 130 may be requested to authenticate the user.

At operation S306, the first site server 130 confirms the user authentication information, and transmits a user authentication signal to the service providing server 110.

At operation S308, the service providing server 110 transmits authentication results through the webpage of the service providing server 110 displayed on the user terminal 120.

At operation S310, the user terminal 120 requests the service providing server 110 to start generating a service file.

At operation S312, the service providing server 110 requests the first site server 130 to transmit an authenticated user's webpage.

At operation S314, the first site server 130 transmits the authenticated user's webpage to the service providing server 110.

At operation S316, the service providing server 110 transmits a user setting screen including the webpage transmitted by the first site server 130 to the user terminal 120.

At operation S318, when a webpage of the first site for generating a service file is selected from the user setting screen displayed on the user terminal 120, a selection signal is transmitted to the service providing server 110.

At operations S320 and S324, the service providing server 110 creates a service file of the selected page (operation S320), and reflects ID information regarding the created service file in an index file (operation S324).

Figure 4A:
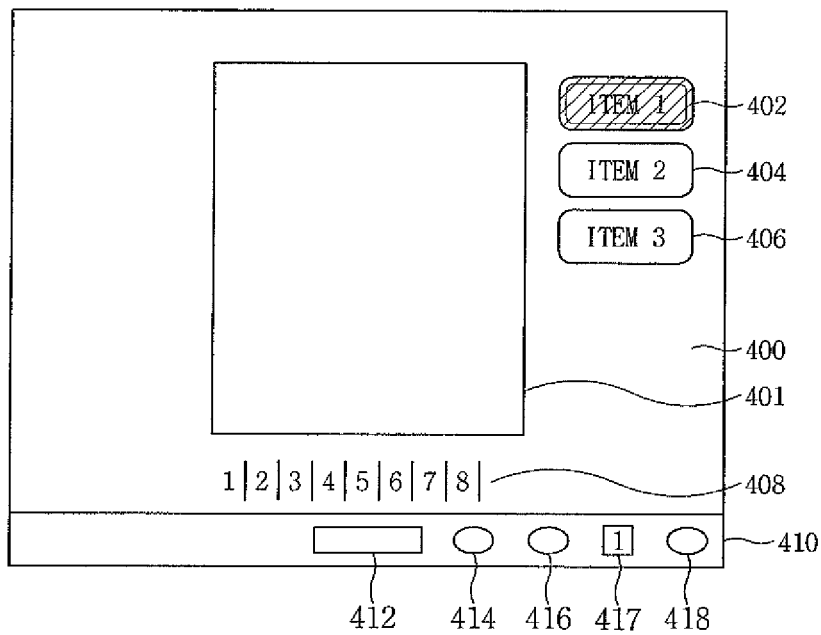
FIGS. 4A through 4C are diagrams illustrating examples of a user setting screen displayed on a user terminal, according to exemplary embodiments of the present inventive concept.
Figure 4B:
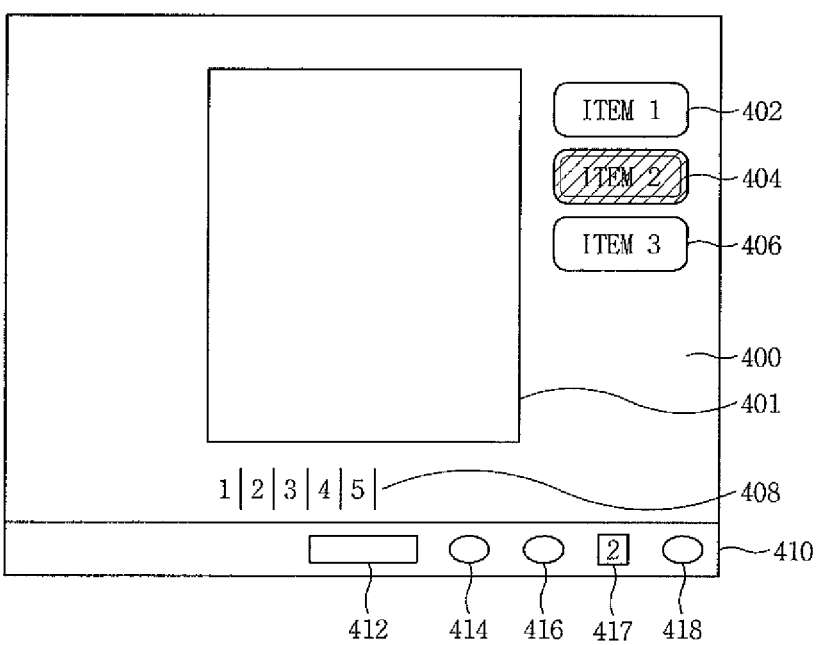
Figure 4C:
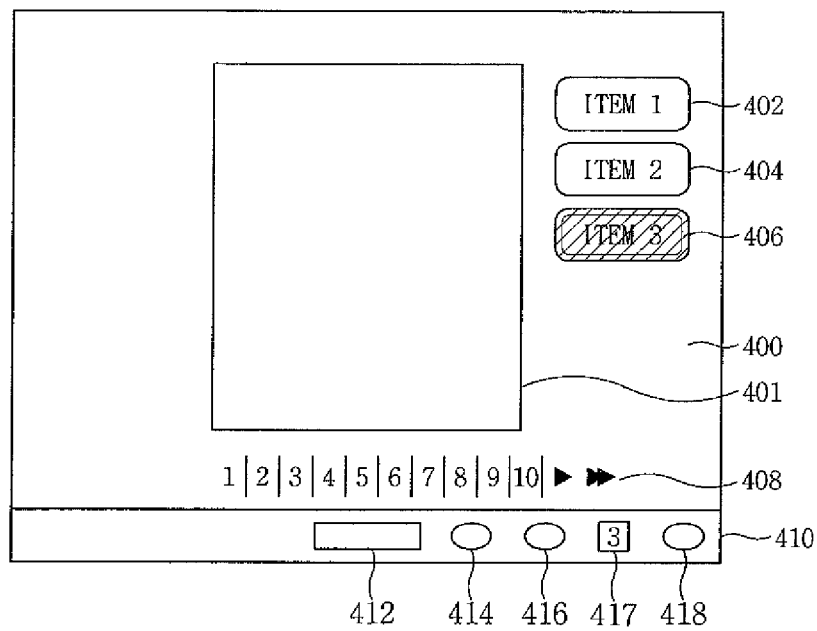

FIGS. 4A through 4C are diagrams illustrating examples of a user setting screen displayed on a user terminal, according to exemplary embodiments of the inventive concept.

A target webpage region 400 displays a webpage transmitted from the first site server 130, and a function selection button region 410 may be displayed on the user setting screen.

The target webpage region 400 may include, for example, a content portion region 401 that displays a content portion of the corresponding webpage, item selection buttons 402, 404, and 406, and a subordinate page number region 408 that displays subordinate page numbers. The subordinate page number region 408 displays different numbers of pages based on the selected item selection button, as described in further detail below.

The function selection button region 410 may include, for example, a file generation button 412, a classification start button 414, a classification end button 416, a classification order display unit 417, and a file generation end button 418.

FIG. 4A shows a case in which an item-1 button 402 is selected from a user's mini-homepage.

When the item-1 button 402 is selected, a subordinate page number region 408 for displaying subordinate page numbers corresponding to Item 1 is displayed, for example, in a lower area of the target webpage region 400.

When the classification start button 414 is initially selected, classification order No. 1 may be displayed on the classification order display unit 417.

While No. 1 is being displayed on the classification order display unit 417, when an arbitrary subordinate page number is selected, a content portion of a webpage corresponding to the selected subordinate page number may be displayed on the content portion region 401. In this state, when the file generation button 412 is selected, content displayed on the target webpage region 400 may be organized into a created service file, which belongs to classification No. 1. Sub-IDs may be given to created service files in the created order, and ID information regarding the created service files may be added to an index file.

After generation of files corresponding to subordinate page Nos. 1 through 8 is completed by the user, when the classification end button 416 is selected, the generation of the service file corresponding to classification No. 1 may be ended.

When the user selects an item-2 button 404, as shown in FIG. 4B, subordinate page numbers corresponding to Item 2 are displayed in the subordinate page number region 408. As shown in the present example, Item 1 has 8 corresponding page numbers, and Item 2 has 5 corresponding page numbers. When the classification start button 414 is selected, classification order No. 2 is displayed on the classification order display unit 417.

While No. 2 is being displayed on the classification order display unit 417, when an arbitrary subordinate page number is selected, a content portion of a webpage corresponding to the selected subordinate page number may be displayed on the content portion region 401. In this state, when the file generation button 412 is selected, content displayed on the target webpage region 400 may be organized into a created service file, which belongs to classification No. 2. Sub-IDs may be given to created service files in the created order, and ID information regarding to the created service files may be added to the index file.

After generation of files corresponding to subordinate page Nos. 1 through 5 is completed by the user, when the classification end button 416 is selected, the generation of the service file corresponding to classification No. 2 is ended.

When the user selects an item-3 button 406, as shown in FIG. 4C, subordinate page numbers corresponding to Item 3 are displayed in the subordinate page number region 408. As shown in the present example, Item 1 has 8 corresponding page numbers, Item 2 has 5 corresponding page numbers, and Item 3 has n corresponding page numbers (in FIG. 4C, n is greater than 10). When the classification start button 414 is selected, classification order No. 3 is displayed on the classification order display unit 417.

While No. 3 is being displayed on the classification order display unit 417, when an arbitrary subordinate page number is selected, a content portion of a webpage corresponding to the selected subordinate page number may be displayed on the content portion region 401. In this state, when the file generation button 412 is selected, content displayed on the target webpage region 400 may be organized into a created service file, which belongs to classification No. 3. Sub-IDs may be given to created service files in the created order, and ID information corresponding to the created service files may be added to the index file.

After generation of files corresponding to subordinate page Nos. 1 through n is completed by the user, when the classification end button 416 is selected, the generation of the service file corresponding to classification No. 3 is ended.

Referring again to FIG. 3, at operation S326, when the file generation end button (refer to 418 in FIG. 4C) of the user setting screen is selected from the user terminal 120, a service file generation end request signal is transmitted to the service providing server 110.

At operation S328, the service providing server 110 transmits a webpage transmission end notification signal to the first site server 130.

At operation S330, after user authentication information (e.g., a login ID and a login password) of the second site is input through the user terminal 120 to the service providing server 110, the user terminal 120 transmits an upload request signal to the service providing server 110.

At operation S332, the service providing server 110 transmits the user authentication information of the second site input through the user terminal 120 to the second site server 140, and requests the second site server 140 to authenticate the user.

At operation S334, the second site server 140 confirms the user authentication information, and transmits a user authentication signal to the service providing server 110.

At operation S336, the service providing server 110 transmits authentication results to the user terminal 120.

At operation S338, the user terminal 120 transmits an upload instruction signal to the service providing server 110 for instructing the service providing server 110 to upload the created service file.

At operation S340, the service providing server 110 uploads the created service file and the generated index file to the second site server 140. In this case, if the service providing server 110 is notified by the second site server 140 that the uploaded file does not satisfy required format or size requirements, the service providing server 110 may convert the created service file to a file having a format and size satisfying the requirements of the second site server 140, and upload the converted file.

At operation S342, the service providing server 110 transmits an upload completion notification signal to the user terminal 120.

Figure 5:
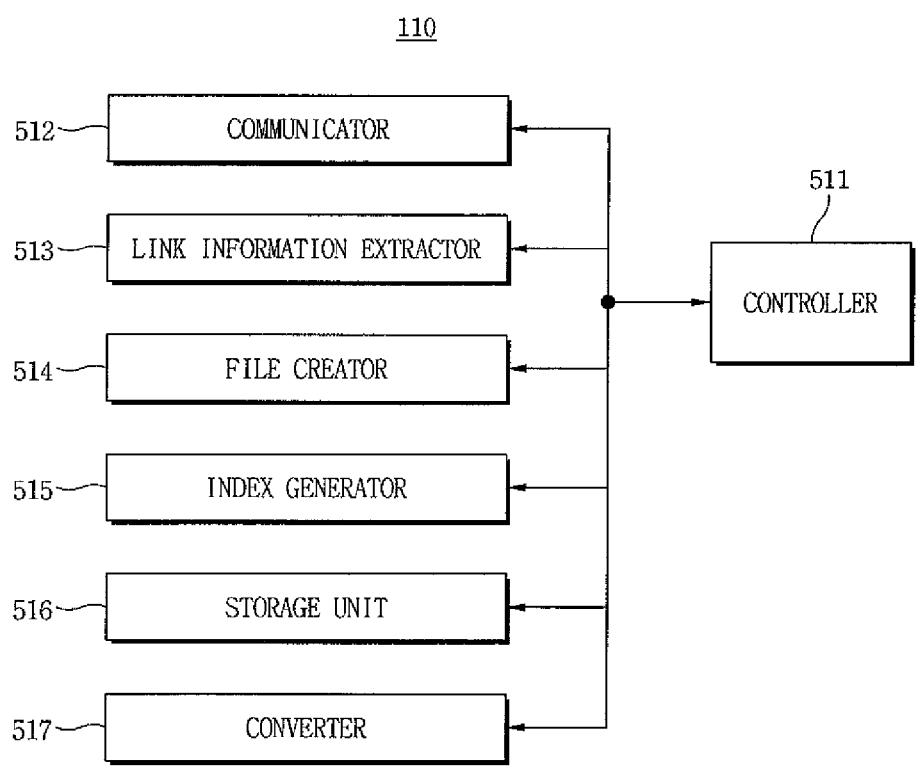
FIG. 5 is a block diagram of a service providing server, according to an exemplary embodiment of the present inventive concept.

FIG. 5 is a block diagram of the service providing server 110 of FIG. 1, according to an exemplary embodiment of the present inventive concept.

Referring to FIG. 5, the service providing server 110 may include a controller 511, a communicator 512, a link information extractor 513, a file creator 514, an index generator 515, a storage unit 516, and a file converter 517.

The controller 511 may control respective functions of a server configured to execute a service in response to a service request of the user terminal 120.

The communicator 512 may communicate with the user terminal 120, the first site server 130, and the second site server 140 by, for example, a wired or wireless connection through the network 150.

The link information extractor 513 may identify buttons containing link information from the webpage transmitted from the first site server 130, and extract link information included in each of the buttons. The controller 511 may request the first site server 130 to transmit a related webpage (e.g., a webpage stored on the first site server 130 that is different from, and related to the webpage transmitted from the first site server 130) corresponding to the extracted link information. The link information may be, for example, uniform resource locator (URL) information.

The file creator 514 may generate a service file (e.g., an image file or a PDF file) having content included in webpages provided by the first site server 130, including the related webpage corresponding to the extracted link information).

The service file may further include ID information for distinguishing and identifying different service files.

The index generator 515 may generate an index file containing index information corresponding to the created service file. The index information may include, for example, information regarding a file connection structure of the service file created at one service request.

The storage unit 516 may store the service file created by the file creator 514 and the index file generated by the index generator 515.

The file converter 517 may convert the service file stored in the storage unit 516 to a file satisfying requirements of the second site server 140. For example, the service file may be converted to have a certain format or size, as required by the second site server 140.

For example, when the created service file is a PDF file and a file format required by the second site server 140 is an image file, the file converter 517 may convert the service file to an image file, and the converted service file may be uploaded to the second site server 140.

In another example, when the created service file is an image file having a larger size than an image file size limit required by the second site server 140, the file converter 517 may convert the created service file to an image file downsized to a size that meets the size limit requirement of the second site server 140, and the downsized image file may be uploaded to the second site server 140.

Figure 6:
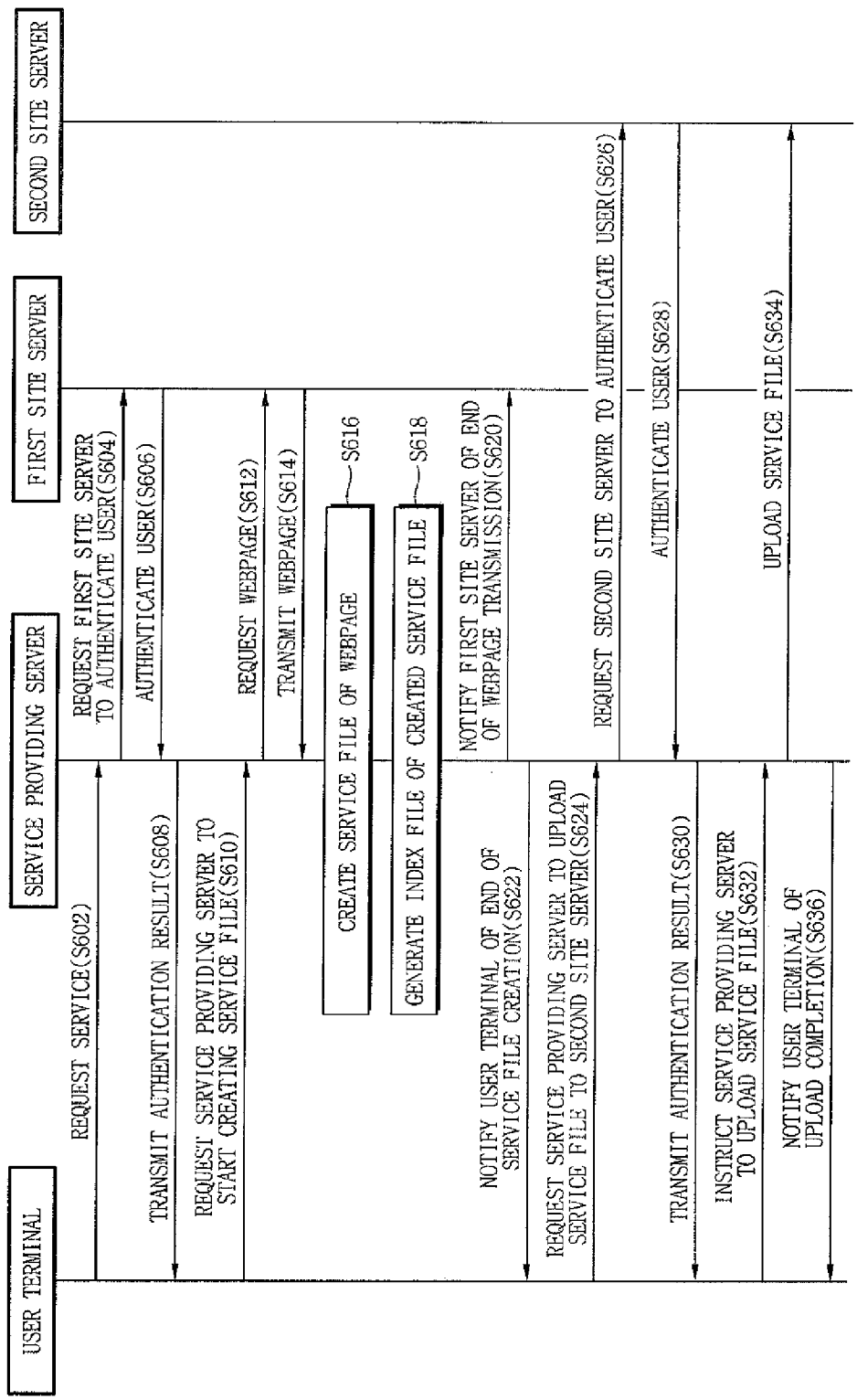
FIG. 6 is a flowchart illustrating a method of providing a content upload service between different sites, according to an exemplary embodiment of the present inventive concept.

FIG. 6 is a flowchart illustrating a method of providing a content upload service between different sites, according to an exemplary embodiment of the present inventive concept.

Referring to FIG. 6, at operation S602, a user terminal 120 connects to the service providing server 110, and requests the service providing server 110 to execute a service with respect to a specific webpage of a first site server 130. For example, after user authentication information (e.g., a login ID and a login password) of a first site is input through the user terminal 120 to the webpage provided by the service providing server 110, the user terminal 120 may transmit a service request signal to the service providing server 110.

At operation S604, the user authentication information of the first site, which is received by the service providing server 110 through the user terminal 120, is transmitted to the first site server 130, and the first site server 130 may be requested to authenticate the user.

At operation S606, the first site server 130 confirms the user authentication information, and transmits a user authentication signal to the service providing server 110.

At operation S608, the service providing server 110 transmits authentication results to the user terminal 120.

At operation S610, the user terminal 120 requests the service providing server 110 to start creating a service file.

At operation S612, the service providing server 110 requests the first site server 130 to transmit an authenticated user's webpage to the first site server 130.

At operation S614, the first site server 130 transmits a main page of the webpage of the authenticated user to the service providing server 110.

At operation S616, the service providing server 110 identifies a button containing link information from the received webpage, extracts the link information from the identified button, requests the first site server 130 to transmit a webpage corresponding to the extracted link information, and creates a service file of the webpage transmitted by the first site server 130. A unique ID may be given to the service file.

At operation S618, the service providing server 110 generates an index file containing ID information regarding the created service file.

The generation of the service file and the generation of the index file may be sequentially performed according to each piece of link information.

For example, in FIGS. 4A, 4B, and 4C, the service providing server 110 may recognize that the item-1, item-2, and item-3 buttons of the main page include link information, and transmit link information corresponding to Item 1 to the first site server 130. Thus, the target webpage region 400 of FIG. 4A may be transmitted to the service providing server 110.

The service providing server 110 may recognize a subordinate page number including the link information, transmit the link information included in the subordinate page number to the first site server 130, receive the corresponding webpage, generate a service file of the received webpage, and add ID information regarding the created service file to the index file. The above-described process may be performed from subordinate page No. 1 to subordinate page No. 8.

After generation of the service file corresponding to Item 1 has ended, when link information corresponding to Item 2 is transmitted to the first site server 130, the target webpage region 400 of FIG. 4B may be transmitted to the service providing server 110.

The service providing server 110 may identify a subordinate page number including the link information, transmit the link information included in the subordinate page number to the first site server 130, receive the corresponding webpage, generate a service file of the received webpage, and add ID information regarding the created service file to the index file. The above-described process may be performed from subordinate page No. 1 to subordinate page No. 5.

After generation of the service file corresponding to Item 2 has ended, when link information corresponding to Item 3 is transmitted to the first site server 130, the target webpage region 400 of FIG. 4C may be transmitted to the service providing server 110.

The service providing server 110 may identify a subordinate page number including the link information, transmit the link information included in the subordinate page number to the first site server 130, receive the corresponding webpage, generate a service file of the received webpage, and add ID information regarding the created service file to the index file. The above-described process may be performed from a subordinate page No. 1 to a subordinate page No. n.

At operation S620, the service providing server 110 transmits a webpage transmission end notification signal to the first site server 130.

At operation S622, the service providing server 110 transmits a service file creation end notification signal to the user terminal 120.

At operation S624, after user authentication information (e.g., a login ID and a login password) of a second site is input through the user terminal 120 to the service providing server 110, the user terminal 120 transmits an upload request signal to the service providing server 110.

At operation S626, the service providing server 110 transmits the user authentication information of the second site input through the user terminal 120 to the second site server 140, and requests the second site server 140 to authenticate the user.

At operation S628, the second site server 140 confirms the user authentication information, and transmits a user authentication signal to the service providing server 110.

At operation S630, the service providing server 110 transmits authentication results to the user terminal 120.

At operation S632, the user terminal 120 transmits an upload instruction signal to the service providing server 110 for instructing the service providing server 110 to upload the created service file.

At operation S634, the service providing server 110 uploads the created service file and the generated index file to the second site server 140. In this case, if the service providing server 110 is notified from the second site server 140 that the uploaded file does not satisfy required format or size conditions, the service providing server 110 may convert the created service file to a file satisfying the format and size requirements of the second site server 140, and upload the converted file.

At operation S636, the service providing server 110 transmits an upload completion notification signal to the user terminal 120.

Figures 7, 8:
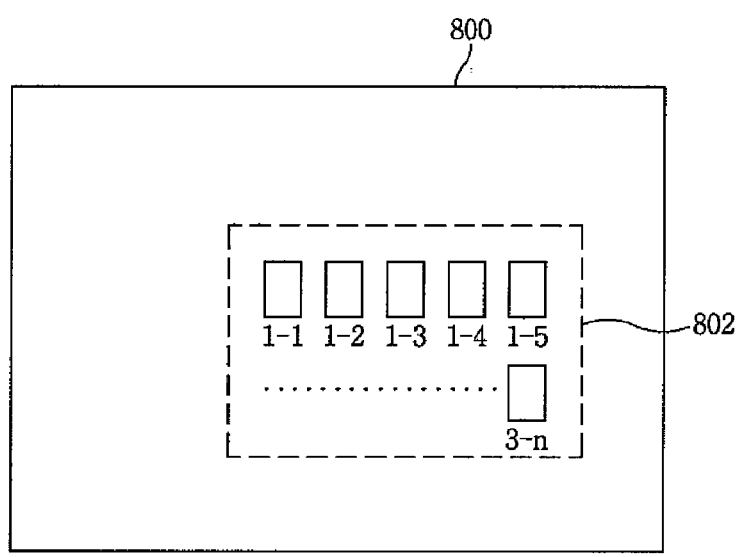
FIG. 7 is a diagram illustrating a structure of an index file, according to an exemplary embodiment of the present inventive concept.
FIG. 8 is a diagram illustrating an example of a process that displays a service file uploaded to a second site server on a user webpage of a second site, according to an exemplary embodiment of the present inventive concept.

FIG. 7 is a diagram illustrating a structure of an index file, according to an exemplary embodiment of the present inventive concept.

The main ID indicates a main webpage of a user of the first site server 130. Classification IDs indicate webpages when respective items having subordinate page numbers are selected from the main webpage. Sub-IDs indicate respective webpages subordinated to the items corresponding respectively to the classification IDs.

FIG. 7 shows a structure of an index file of the examples given with reference to FIGS. 4A, 4B, and 4C. Referring to FIG. 7, classification ID 1, classification ID 2, and classification ID 3 corresponding to the three items 402, 404, and 406 may be included in the index file, and include 8 subordinate pages, 5 subordinate pages, and n subordinate pages, respectively.

FIG. 8 is a diagram illustrating an example of a process that displays a service file uploaded to a second site server on a user webpage of a second site, according to an exemplary embodiment of the present inventive concept.

When service files are uploaded as image files to the second site server 140, the uploaded image files may be sequentially arranged in the order of sub-IDs of an index file in an image file arrangement region 802 of a second site webpage screen 800 of a user.

In exemplary embodiments, instead of sequentially arranging the image files, only a typical image file may be displayed, and the remaining image files may be displayed as an album including an image turning button.

Exemplary embodiments of the present inventive concept may be applied to an apparatus capable of posting content provided by a specific website on another website.

According to exemplary embodiments of the present inventive concept, content provided on a specific page of a conventional site may be read on another site so that a user can easily utilize conventional community information on different sites.

The components of the system (e.g., the components shown in FIGS. 1, 2 and 5) may include, but are not limited to, one or more processors or processing units, a system memory, and a bus that couples various system components including system memory to the processor(s). The bus represents one or more of any of several types of bus structures, including a memory bus or memory controller, a peripheral bus, an accelerated graphics port, and a processor or local bus using any of a variety of bus architectures.

It is to be understood that the present inventive concept may be implemented in various forms of hardware, software, firmware, special purpose processors, or a combination thereof. In one embodiment, the present inventive concept may be implemented in software as an application program tangibly embodied on a program storage device. The application program may be uploaded to, and executed by, a machine comprising any suitable architecture.

Figure 9:
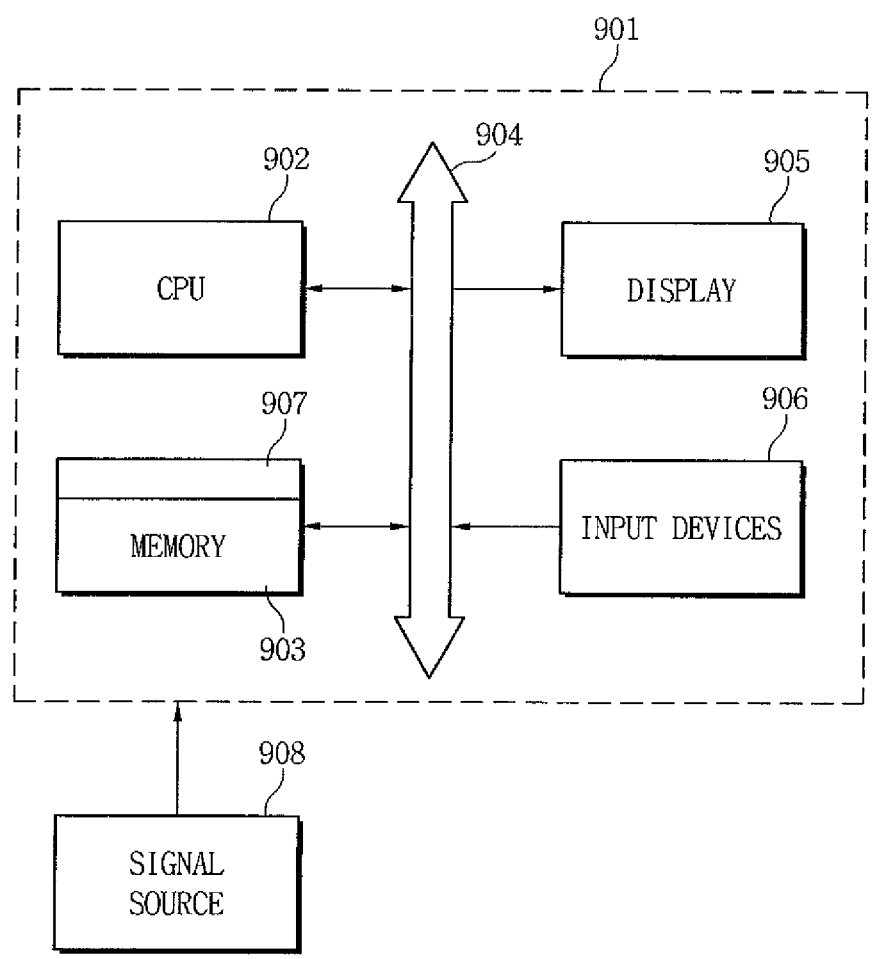
FIG. 9 shows an exemplary computer system for executing a method according to an exemplary embodiment of the present inventive concept.

Referring to FIG. 9, according to an embodiment of the present inventive concept, a computer system 901 supporting an apparatus and method for providing a content upload service between different sites includes, inter alia, a central processing unit (CPU) 902, a memory 903 and an input/output (I/O) interface 904. The computer system 901 is generally coupled through the I/O interface 904 to a display 905 and various input devices 906 such as a mouse and keyboard. The support circuits can include circuits such as cache, power supplies, clock circuits, and a communications bus. The memory 903 can include random access memory (RAM), read only memory (ROM), disk drive, tape drive, or a combination thereof. The present invention can be implemented as a routine 907 that is stored in memory 903 and executed by the CPU 902 to process the signal from the signal source 908. As such, the computer system 901 is a general-purpose computer system that becomes a specific-purpose computer system when executing the routine 907 of the present inventive concept.

The computer platform 901 also includes an operating system and micro instruction code. The various processes and functions described herein may either be part of the micro instruction code, or part of the application program (or a combination thereof), which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present inventive concept is programmed. Given the teachings of the present inventive concept provided herein, one of ordinary skill in the related art will be able to contemplate these and similar implementations or configurations of the present inventive concept.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of providing a content upload service, comprising:
   receiving a user's first webpage from a first site server;
   creating a service file comprising content of the received user's first webpage; and
   uploading the created service file to a second site server that provides a second webpage of the user, different from the first webpage, wherein creating the service file comprises:
   providing a user setting screen comprising the first webpage to a user terminal in response to receiving a service request signal from the user terminal, wherein the service file is created based on content of a webpage selected through the user setting screen;
   generating identification (ID) information identifying the created service file; and
   generating a button on the user setting screen for setting a classification number, wherein the created service file comprises a sub-ID subordinated to a displayed classification number.

2. The method of claim 1, further comprising:
   identifying a button of the first webpage that includes link information;
   extracting the link information; and
   receiving, from the first site server, a related webpage corresponding to the extracted link information,
   wherein the created service file further comprises content of the related webpage.

3. The method of claim 1, further comprising:
converting the service file to a different file having a format or a size satisfying a requirement of the second site server; and
uploading the converted service file to the second site server.

4. A method of providing a content upload service, comprising:
transmitting a service request, from a user terminal to a service providing server, comprising user authentication information of a first webpage of a user stored at a first site server;
transmitting an authentication request, from the service providing server to the first site server, requesting the first site server to authenticate the user;
transmitting a user authentication signal, from the first site server to the service providing server, indicating whether user authentication was successful;
transmitting a service file request, from the user terminal to the service providing server, requesting the service providing server to start generating a service file;
transmitting a webpage request, from the service providing server to the first site server, requesting the first site server to transmit the first webpage;
transmitting the first webpage from the first site server to the service providing server;
creating the service file, wherein the service file comprises content of the first webpage; and
uploading the created service file to a second site server that provides a second webpage of the user, different from the first webpage, wherein creating the service file comprises:
providing a user setting screen comprising the first webpage to the user terminal in response to the service request being transmitted from the user terminal, wherein the service file is created based on content of a webpage selected through the user setting screen;
generating identification (ID) information identifying the created service file; and
generating a button on the user setting screen for setting a classification number, wherein the created service file comprises a sub-ID subordinated to a displayed classification number.

5. The method of claim 4, further comprising:
receiving user authentication information corresponding to the user's second webpage from the user terminal;
transmitting the received user authentication information to the second site server; and
requesting the second site server to authenticate the user.

6. The method of claim 4, further comprising:
identifying a button of the first webpage that includes link information;
extracting the link information; and
requesting to receive, from the first site server, a related webpage corresponding to the extracted link information, wherein the created service file further comprises content of the related webpage.

7. The method of claim 4, further comprising:
converting the service file to a different file having a format or a size satisfying a requirement of the second site server; and
uploading the converted service file to the second site server.

8. The method of claim 4, wherein the service file is an image file or a portable document format (PDF) file.

9. A method of providing a content upload service, comprising:
receiving a user's first webpage from a first site server;
creating a service file comprising content of the received user's first webpage; and
uploading the created service file to a second site server that provides a second webpage of the user, different from the first webpage,
wherein receiving the user's first webpage from the first site server comprises:
identifying a button of the first webpage that includes link information;
extracting the link information;
receiving a related webpage corresponding to the extracted link information from the first site server; and
receiving, sequentially, webpages corresponding to subordinate page numbers identified in the related webpage based on an order of the subordinate page numbers, wherein the created service file further comprises content of the related webpage and content of the webpages corresponding to the subordinate page numbers,
wherein creating the service file comprises:
generating classification IDs respectively corresponding to buttons including the link information; and
assigning sub-IDs subordinated to a specific classification ID to a service file of a webpage corresponding to a subordinate page number included in a webpage corresponding to the specific classification ID.

10. The method of claim 9, further comprising:
receiving user authentication information corresponding to the user's first webpage from a user terminal;
transmitting the received user authentication information to the first site server; and
requesting the first site server to authenticate the user.

11. The method of claim 9, further comprising:
receiving user authentication information corresponding to the user's second webpage from a user terminal;
transmitting the received user authentication information to the second site server; and
requesting the second site server to authenticate the user.

12. The method of claim 9, further comprising:
converting the service file to a different file having a format or a size satisfying a requirement of the second site server; and
uploading the converted service file to the second site server.

13. The method of claim 9, wherein the service file is an image file or a portable document format (PDF) file.

14. The method of claim 1, further comprising:
receiving user authentication information corresponding to the user's first webpage from the user terminal;
transmitting the received user authentication information to the first site server; and
requesting the first site server to authenticate the user.

15. The method of claim 1, further comprising:
receiving user authentication information corresponding to the user's second webpage from the user terminal;
transmitting the received user authentication information to the second site server; and
requesting the second site server to authenticate the user.

16. The method of claim 1, wherein the service file is an image file or a portable document format (PDF) file.

* * * * *